United States Patent [19]
Wegmann

[11] Patent Number: 5,108,673
[45] Date of Patent: Apr. 28, 1992

[54] THERMOPLASTIC GRANULE, METHOD OF PRODUCING THE SAME AND FOAMED MOLDED BODY PRODUCED BY SUCH GRANULES

[75] Inventor: Adolf Wegmann, Long Beach, Calif.

[73] Assignee: Storopack Hans Reichenecker GmbH & Co., Weinstadt, Fed. Rep. of Germany

[21] Appl. No.: 641,638

[22] Filed: Jan. 17, 1991

Related U.S. Application Data

[63] Continuation of Ser. No. 141,411, Jan. 8, 1988, abandoned.

[30] Foreign Application Priority Data

Jul. 8, 1987 [DE] Fed. Rep. of Germany ....... 3722539

[51] Int. Cl.$^5$ .............................................. B29C 67/22
[52] U.S. Cl. .......................................... 264/51; 264/53; 264/143; 264/DIG. 9; 264/DIG. 13
[58] Field of Search ............. 264/51, 53, 143, DIG. 5, 264/DIG. 13, DIG. 10, 126, DIG. 9

[56] References Cited

U.S. PATENT DOCUMENTS

| | | | |
|---|---|---|---|
| 2,576,977 | 12/1951 | Stober | 264/53 |
| 2,911,382 | 11/1959 | Barkhuff, Jr. et al. | 264/DIG. 5 |
| 2,941,964 | 6/1960 | Houston et al. | 264/DIG. 5 |
| 2,941,965 | 6/1960 | Ingram | 264/DIG. 5 |
| 3,003,193 | 10/1961 | Chisholm et al. | 264/53 |
| 3,026,272 | 3/1962 | Rubens et al. | 264/53 |
| 3,026,273 | 3/1962 | Engles | 264/53 |
| 3,089,857 | 5/1963 | Pottenger | 264/53 |
| 3,121,132 | 2/1964 | Del Bene | 264/53 |
| 3,121,911 | 2/1964 | Lightner | 264/53 |
| 3,372,215 | 3/1968 | Muirhead et al. | 264/53 |
| 3,482,006 | 12/1969 | Carlson, Jr. | 264/53 |
| 3,856,904 | 12/1974 | Ayres | 264/51 |
| 3,929,686 | 12/1975 | Stevenson | 521/60 |
| 3,933,959 | 1/1976 | Skochdopole et al. | 264/51 |
| 4,206,166 | 6/1980 | Hayashi et al. | 264/54 |
| 4,243,717 | 1/1981 | Gahmig | 521/56 |
| 4,361,656 | 11/1982 | Mostafa | 521/56 X |
| 4,627,946 | 12/1986 | Crabtree | 264/51 X |
| 4,790,367 | 12/1988 | Moll et al. | 521/56 X |

Primary Examiner—Robert A. Dawson
Assistant Examiner—Allan R. Kuhns
Attorney, Agent, or Firm—Jones, Tullar & Cooper

[57] ABSTRACT

A thermoplastic plastic granule having an expansion agent uniformly distributed within a plastic polymer-matrix and, containing additionally a cell-forming agent in a finely and uniformly distributed manner. Such thermoplastic granules are used for producing foamed molded bodies in a mold.

9 Claims, 1 Drawing Sheet

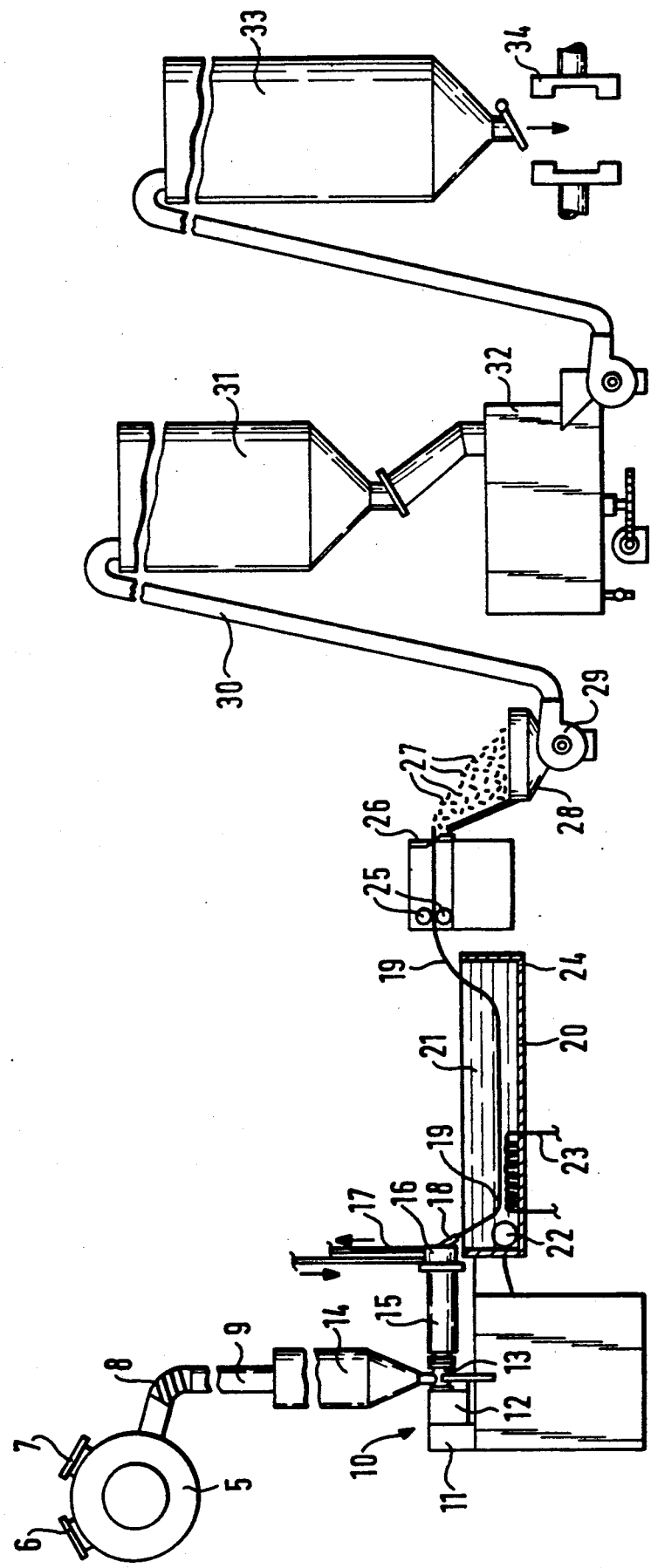

THERMOPLASTIC GRANULE, METHOD OF PRODUCING THE SAME AND FOAMED MOLDED BODY PRODUCED BY SUCH GRANULES

This is a continuation of co-pending application Ser. No. 07/141,411 filed on Jan. 8, 1988, now abandoned.

This invention relates to thermoplastic plastic granules having an expanding agent incorporated, a method for producing such granules, and the use of such granules for forming foamed molded bodies.

Foamed molded bodies are used as packing material in a wide variety of applications. Such foamed molded bodies are constructed in such a manner that their inner side corresponds to a negative impression of the outer periphery of the article to be packed; their outer side fits into a cardboard box or a packing case respectively. The article to be packed thereby is at all its sides protected against damage, especially during transport. With greater articles, usually the sensitive corners or edges solely are protected by such molded bodies.

On preparing the molded bodies, first a plastic material, generally polystyrene, is treated with an expanding agent. A usual expanding agent is n-pentane, which is supplied to the plasticized plastic material in an extruder. By rapid cooling of the material when leaving the extruder, the expanding agent remains incorporated within the polymer matrix. Usually the plastic material is granulated thereafter and is in this form available in the trade.

Before finally making the molded bodies, the granules are pre-expanded (pre-foamed) to a predetermined extent by subjecting them to a heat treatment. During this heat treatment, the plastic polymer matrix is softened and the expanding agent incorporated in the polymer matrix expands and thereby increases the volume of the forming plastic bodies to a predetermined size. Within the body, which thus has been blown-up, a foam-like cell structure is established having honeycomb-like spherical hollow spaces, containing the expanding agent. In the final expanding (foaming) process the pre-expanded bodies are finally expanded within a closed mold form by further heat treatment. The individual pre-expanded plastic bodies or pellets of generally spherical shape thereby are further expanded and connect to each other with their surfaces by melting and adhering or sticking respectively to each other to form a uniform molded body corresponding to the said form.

A disadvantage of such foamed molded bodies is that their cell structure is characterized by relatively great and irregularly shaped cells. It is, therefore, necessary to use hard and rigid plastic material for assuring sufficient rigidity of the molded body. Such molded bodies generally have only a very limited elasticity. When heavy loads are applied to such bodies they either break or they transmit a major part of the impact energy to the article to be protected. Therefore, there still remains a considerable risk of damaging said articles.

For assuring a certain minimum strength, the bulk density of such molded bodies is about 20 kg/m$^3$. Therefore a relatively great amount of material is needed for the preparation of such molded bodies.

It is therefore an object of the invention to provide a thermoplastic material, with which it is possible to produce foam molded bodies, which can be subjected to high loads and, at the same time, exhibit good insulating properties. They should be particularly suited to absorb shocks and be pressure-resistent; further, they should have a low bulk density and show an improved elasticity.

This object is achieved by using thermoplastic granules into which a cell-forming agent or nucleating agent is incorporated in solid form. Such granules are produced by drumming on the nucleating agent to the surface of "normal" thermoplastic plastic granules by distributing the nucleating agent highly uniformly on said surfaces and such that good adherence is achieved, and mixing the granules, which have been treated in this manner, in an extruder and therein plastifying them to form a uniform mass. Thereafter, the mass leaving the extruder, is cooled thus preventing any expansion. When using such thermoplastic granules in a per se known manner for producing foamed molded bodies, first, said granules are pre-expanded and, thereafter, finally expanded, both by heat treatment, within a mold to form molded bodies. As a result, these bodies exhibit a very fine cell or foam structure leading to a molded body with improved elasticity. Such molded bodies are resiliently or elastically deformable, i.e. they rebuild their original shape after shocks or pressure loads. Further, this structure, by having an increased number of branches or shreads per volume, decreases the danger of breaking. Surprisingly, such foam molded bodies have a bulk density less than the one of previous molded bodies but still retain improved properties. Molded bodies according to the invention can be used wherever such properties are needed. In addition to using them as packing material, they may also be used as insulating plates in floors, walls, or the like.

The use of cell-forming agents or nucleating agents is per se known in the field of extrusion technology, namely of producing so-called "loose-fill" products. With it, small packing chips with a size of 2 to 4 cm and of particular geometrical shape, such as half-shells or the like, are produced. With this particular known method, the plastic material and the nucleating agent are mixed in the extruder immediately before processing. The plastic material is cut immediately after leaving the extruder without cooling. The particles start expanding immediately. The nucleating agent, in a chemical reaction immediately starts producing a gas, preferably carbon dioxide, which causes the cell-forming. Together with the expanding agent, this leads to an expansion of the particles. It should be emphazised that the nucleating agent is not yet present in the yet unexpanded plastic granule.

The thermoplastic granules in accordance to the invention may contain an amount of cell-forming agent of about 0.1 to 0.2% by weight; the average grain size of the cell-forming agent may be less than 40 u. These values are especially advantageous. Preferably expandable polystyrene may be used as thermoplastic platic material, and especially in such a quantity that the finally expanded molded bodies have a bulk density of 3 to 15 kg/m$^3$.

BRIEF DESCRIPTION OF THE DRAWING

In the following, the invention will be explained by means of the accompanying drawing which is a schematic view of a device for producing thermoplastic plastic granules and foamed molded bodies.

DETAILED DESCRIPTION OF THE DRAWING

The device for carrying out the process of producing the plastic granules and the foam material body has a drum 5 provided with openings 6 and 7 through which the plastic material and the finely ground nucleation agent are added. When desired, further additives such as colouring pigments or auxiliary flow agents, as e.g. known under the trademark "EXTRUSIL", can be added. Within the drum 5 the finely powdered additives are "drummed-on" to the surface of the plastic granules. This means that a layer of these additives is formed strongly adhering to and uniformely distributed on the surface of the granules, which, within themselves, do not yet contain the nucleating agent. The grain size of the nucleating agent is <40 u.

As a plastic material in this process there is used so-called "expandable polystyrene" (EPS), i.e. a polymer of styrene containing an expanding agent such as n-pentane. The incorporated expanding agent, however, is uniformly distributed within the plastic polymer-matrix of this granule.

In the drum 5, e.g. 4 g (0.0089%) nucleating agent are added to 45 kg EPS and 10 g (0.022%) "EXTRUSIL". As a nucleating agent, a multicomponent nucleation agent known under the trademark "HYDROCEROL" is used. Its first acid component is either a water-repellent anhydrocitric acid or a citric acid monohydrate. The second component is a sodium hydrogen carbonate which reacts with the already mentioned acid component at a certain temperature to produce carbon dioxide and thus to build-up the nuclei (or cells). The granules, with the additives drummed-on, are fed by means of a conveying device 8 and a conveying pipe 9 to a feeding funnel 14, the bottom end of which is connected to an extrusion device 10.

The extrusion device 10 comprises a driving motor 11, a gear 12, a material pull-in zone 13 connected to the feeding funnel 14, and an extruder 15.

At the area of its front outlet end 16 the extruder 15 is provided with a cooling device 17. An outlet nozzle 18 protruds from the end 16 of the extruder 15. A continuous string 19 of molten plastic is thereby produced.

Below the nozzle 18 there is disposed a water tank 20 filled with water 21. The level of water within the tank 20 is such that the water surface is about 1 cm below the outlet opening of the nozzle 18. Within the tank 20 a circulating pump 22 is disposed and, further, a cooling device 23 for holding the temperature of water in the water tank 20 at about 16° C.

The plastic material string 19 leaving the nozzle 18 solidifies immediately after falling into the water 21. It is guided by conveyor rollers—not shown—within water tank 20. At the end 24, the string 19 leaves tank 20. The length of the water tank 20 is about 2.5 m. After leaving the water tank 20 the plastic string 19 passes through a pair of rollers 25 and is fed to a cutting device 26. The rollers 25 are driven by means not shown and represent a puller for the plastic string 19. The cutting device 26 cuts the plastic string 19 into small sections, i.e. granules 27, which then can be stored in the container 28.

The plastic granules 27 thus obtained have incorporated within them the expanding agent and the additionally cell-forming agent or nucleating agent. They are incorporated within the polymer matrix of the plastic material. These granules can be stored and/or sold or immediately be fed for further treatment to form foamed molded bodies.

For producing foamed molded bodies the ganules 27 are fed from the container 28 by means of a blower 29 through a pipe 30 into a storage container 31. From the storage container 31 the granules 27 are fed to a prefoamer (pre-expander) 32 and are pre-expanded therein into parts or pellets. The pre-expanded parts or pellets are at first stored in a further storage container 33, then fed to an aproriate mold 34, and finally are expanded therein. The nucleating agent within the granules leads to a foam with a very fine cellular structure which exhibits very good cushioning properties of the finally foamed molded bodies. Such foam can be called "elastified foam". The elasticity is such that outer shocks or pressures are readily absorbed by elastic deformation. It may be mentioned, however, that the elasticity and the accompanying change of shape only occur within a certain range because of the fine cellular and multiple branch cell structure only allow deformation to a certain extent. A considerable portion of any load energy is absorbed by inner friction. After removing the load, the original shape rebuilds itself. An article protected by such a molded body is held stationary in or between the molded body parts without any "drifting". Outer forces acting the molded bodies are distributed and absorbed by its elastic deformation. This results in very good upholstery properties. The use of such material is not restricted to package material; it rather is very versatile. For example, plate of such materials can be used to support plates of stones for floors etc. and thereby good thermal and noise insolation. Such plates can also be used at large surface junction points subject to mechanical loads or as vibrations.

These advantageous effects nevertheless merely require the low bulk density mentioned above. When expandible polystyrene is used, the molded bodies can have a bulk densities of about 3 to 15 kg/m$^3$ contrary to the usual bulk densities of about 20 kg/m$^3$.

I claim:

1. A method for producing foamed molded bodies from thermoplastic granular material comprising polystyrene in such an amount that the foamed molded body has a bulk density of 3 to 15 kg/m$^3$, each granule of said granular material comprising a polymer substance containing a uniformly distributed expanding agent within the substance, comprising the steps of:

providing a nucleating agent in solid form having a grain size of less than 40$\mu$ and combining the thermoplastic granular material with the nucleating agent;

coating the surface of each yet unexpanded granule of said granular material with the nucleating agent of an amount less than or equal to 0.5% by weight of the foamed molded body;

extruding the yet unexpanded coated granules into a string of plastic, thus incorporating the nucleating agent within the polymer substance of said granules of said granular material;

solidifying the extruded string of plastic and cutting said string of plastic into granules now having the expanding agent and the nucleating agent incorporated within their polymeric substance;

pre-expanding the granules derived in the previous step;

placing the pre-expanded granules of said granular material in a mold; and applying heat to the mold thereby further expanding the pre-expanded granules of said granular material in the mold.

2. The method as defined in claim 1, wherein the further expansion due to the application of heat causes the granules to press against the mold surface which produces the fusion necessary to produce the foamed molded body.

3. The method as defined in claim 1, wherein the extruded string of plastic is cooled before cutting thereby not allowing expansion to occur.

4. The method as defined in claim 1, wherein coating is produced by drumming.

5. The method as defined in claim 1, wherein coating is produced by drumming, and wherein the extruded string of plastic is cooled before cutting thereby not allowing expansion to occur.

6. The method as defined in claim 1, further comprising the step of:

cooling the extruded string of plastic prior to solidifying.

7. The method as defined in claim 6, wherein a multicomponent nucleating agent is provided.

8. The method as defined in claim 7, wherein the multicomponent nucleating agent comprises a first acid component and second component of sodium hydrogen carbonate which reacts with the first acid component to produce carbon dioxide and to thus build-up the nuclei of the nucleating agent.

9. The method as defined in claim 6, wherein the cooled and extruded string of plastic is solidified by passing it through a water tank.

* * * * *